United States Patent [19]
Putnins et al.

[11] Patent Number: 5,778,244
[45] Date of Patent: Jul. 7, 1998

[54] DIGITAL SIGNAL PROCESSING UNIT USING DIGITAL SIGNAL PROCESSOR ARRAY WITH RECIRCULATION

[75] Inventors: Zigmunds Andis Putnins, Ridgewood; Henry Christian Briel, III, Rochelle Park, both of N.J.; Michael James Luddy, Sea Cliff, N.Y.

[73] Assignee: Timeplex, Inc., Woodcliff, N.J.

[21] Appl. No.: 726,632

[22] Filed: Oct. 7, 1996

[51] Int. Cl.$^6$ ........................... G06F 15/16
[52] U.S. Cl. ............... 395/800.5; 395/800.11; 395/800.25; 395/800.35
[58] Field of Search .......... 395/800.11, 800.15, 395/800.25, 800.35

[56] References Cited

U.S. PATENT DOCUMENTS

| | | | |
|---|---|---|---|
| 4,598,400 | 7/1986 | Hillis | 370/60 |
| 4,646,236 | 2/1987 | Crockett et al. | 364/200 |
| 4,692,860 | 9/1987 | Andersen | 364/200 |
| 4,839,798 | 6/1989 | Eguchi et al. | 364/200 |
| 5,008,815 | 4/1991 | Hillis | 364/200 |
| 5,031,089 | 7/1991 | Liu et al. | 364/200 |
| 5,151,996 | 9/1992 | Hillis | 395/800 |
| 5,152,000 | 9/1992 | Hillis | 395/800 |
| 5,155,851 | 10/1992 | Krishman | 395/650 |
| 5,175,865 | 12/1992 | Hillis | 395/800 |
| 5,265,233 | 11/1993 | Frailong et al. | 395/425 |
| 5,283,897 | 2/1994 | Georgiadis et al. | 395/650 |
| 5,291,611 | 3/1994 | Davis et al. | 395/800 |
| 5,335,326 | 8/1994 | Nguyen et al. | 395/250 |
| 5,459,864 | 10/1995 | Brent et al. | 395/650 |
| 5,481,727 | 1/1996 | Asano et al. | 395/477 |
| 5,485,627 | 1/1996 | Hillis | 395/800 |
| 5,506,998 | 4/1996 | Kato et al. | 395/800 |
| 5,535,408 | 7/1996 | Hillis | 395/800 |

*Primary Examiner*—Eric Coleman
*Assistant Examiner*—Mackly Monestime
*Attorney, Agent, or Firm*—Irwin Ostroff; Robert Ardis

[57] ABSTRACT

A digital signal processing unit with an array of digital signal processors (DSP) is provided with a recirculation path for data sequences which cannot be fully processed by a single pass through the array. An input programmable gate array (PGA) controls distribution of data sequences to individual DSPs for processing and an output PGA controls their recollection. The recirculation path is provided by a recirculation register which is write enabled by the output PGA and read enabled by the input PGA.

7 Claims, 2 Drawing Sheets

DIGITAL SIGNAL PROCESSING UNIT USING DIGITAL SIGNAL PROCESSOR ARRAY WITH RECIRCULATION

FIELD OF THE INVENTION

This invention relates generally to digital signal processing units using digital signal processor (DSP) arrays and, more particularly, to digital signal processing units using DSP arrays in which a single pass of data through a DSP does not complete the processing of all of such data.

BACKGROUND OF THE INVENTION

Many DSP applications require data to be processed by more than one DSP in order to achieve system requirements. A first example of such an application is a DSP system where real-time constraints (e.g., absolute time deadlines that may not be violated if the system is to function properly) cannot be met by a single DSP. DSPs often receive data sequences which need to be processed in a fixed interval of time, such as a sampling period. During that fixed interval, the DSP must complete its processing on the current sequence of data and prepare itself for the next sequence of data it is programmed to receive. Limitations upon the amount of computational work a DSP may complete during a sampling period may depend upon the duration of the sampling period, the technology of the DSP, and the nature of the processing algorithms.

A second example of an application requiring that a data sequence be processed by more than one DSP is one in which the DSP devices themselves may have limited code space available for their processing tasks. In other words, the number of data bytes in a software algorithm used may be more than allowed by the technology and implementation of the processor. Such constraints limit the degree to which sequences of data can be processed by a single DSP.

A third example of such an application is one in which either a plurality of data streams need to be processed or a single data stream needs to be subdivided into a plurality of individual streams for processing because the aggregate stream may be beyond the real-time processing capability of any single DSP.

A known approach to solving the problems presented by this third example is illustrated by U.S. Pat. No. 5,291,611 to Alan J. Davis et al., which issued Mar. 1, 1994. In a digital signal processing unit assembled according to the Davis et al. approach, a data stream is received on one or more signal processing unit input lines by an input programmable gate array (PGA). The input PGA then distributes individual data sequences on respective input lines to the individual DSPs comprising a DSP array. An output PGA receives the processed data on respective output lines from the individual DSPs. The output PGA then supplies the data in the form of a processed aggregate data stream or streams to one or more signal processing unit output lines.

A digital signal processing unit of the type illustrated in the Davis et al. patent may be used to address the problems presented by the first and second examples as well. Because the data streams from their output PGAs are compatible with the data streams to their input PGAs, digital signal processing units of this type may be concatenated, thereby connecting their respective DSP arrays in tandem. With such concatenation, processing tasks may be pipelined to solve problems presented by the first example or divided by algorithm in order to solve problems presented by the second.

Depending upon the individual situation, however, the approach illustrated in the Davis et al. patent may not represent an efficient solution. In the first and second examples, such an approach necessitates using a plurality of DSP arrays, not simply a plurality of DSPs in a single array, no matter how large the arrays may be. Adding one or more DSP arrays may involve adding extra modules to a system, thereby adding to both cost and processing overhead.

SUMMARY OF THE INVENTION

In accordance with the present invention, a digital signal processing unit has at least one unit signal input line for receiving a succession of individual sequences of input data and comprises an input programmable gate array (PGA) connected to the unit signal input line for supplying the input data as distributed data on a plurality of processor input lines. Each DSP in an array of DSPs is connected to receive individual data sequences from a corresponding one of the input lines. Each unit of data in these data sequences comprises two segments: a task segment, sometimes referred to as a task number, and a data segment, sometimes referred to simply as data. Each DSP produces processed data on a corresponding one of a plurality of processor output lines. As with the input to each DSP, the processed output unit of data comprises two segments: a task number and data. An output PGA is connected to the processor output lines for organizing the processed data and supplying it in on one or more processing unit output lines.

In accordance with the invention, a recirculation path from the output PGA to the input PGA feeds back any sequence of the processed data that requires further processing by the DSP array. The recirculation path carries the recirculated data sequences and includes a recirculation register, the timing of which is under control of a system clock. Data units in the recirculation path contain three fields: a task field, a destination field (sometimes referred to as a DSP number) and a data field. The destination field, or DSP number, indicates which one of the DSPs in the array is to perform the additional processing. Flow of data into the recirculation register is controlled from the output PGA via a write enabling connection, while flow of data from the recirculation register back into the input PGA is controlled from the latter via a read enabling connection. Finally, at least one processing unit output line transmits the processed data from the output PGA, and a system clock controls not only timing of the DSPs but also timing of both the input PGA and the output PGA.

In at least one important embodiment of the invention, a first translation random access memory (RAM) controls the input PGA, and a second translation RAM controls the output PGA. The first translation RAM controls routing of data sequences to particular DSPs prior to their pass through the DSP array, and it tags individual elements in those data sequences with predetermined task numbers. The DSPs use these task numbers to identify their respective data streams. The DSPs then similarly tag the elements in their own output data streams. In the second translation RAM, a look-up table controls the manner in which elements in processed data streams are routed. This translation process involves both the task number and the derived DSP number from which the data stream element was received as input. The output of the translation process is the desired destination for each data sequence.

When the second translation RAM determines that the destination is recirculation (because a particular data sequence requires further processing), then the translation process also yields both the number of the DSP that is to receive the stream and a task number that the indicated DSP will use to identify the sequence. For recirculation, the output PGA loads the DSP number, task number, and data values into the recirculation register, using a write enable signal. The input PGA sends a read enable signal to the recirculation register and routes the data element, with the assigned task number, to the designated DSP.

The present invention is particularly advantageous in that it permits DSPs to be used with maximum efficiency. A data sequence may be recirculated through the same DSP which performed the initial processing upon it or through another DSP, depending upon how the processing load is distributed among individual DSPs in the array.

The invention may be more fully understood from the following detailed description of a specific embodiment, taken in the light of the accompanying drawing and the appended claims.

DETAILED DESCRIPTION

Figure 1:
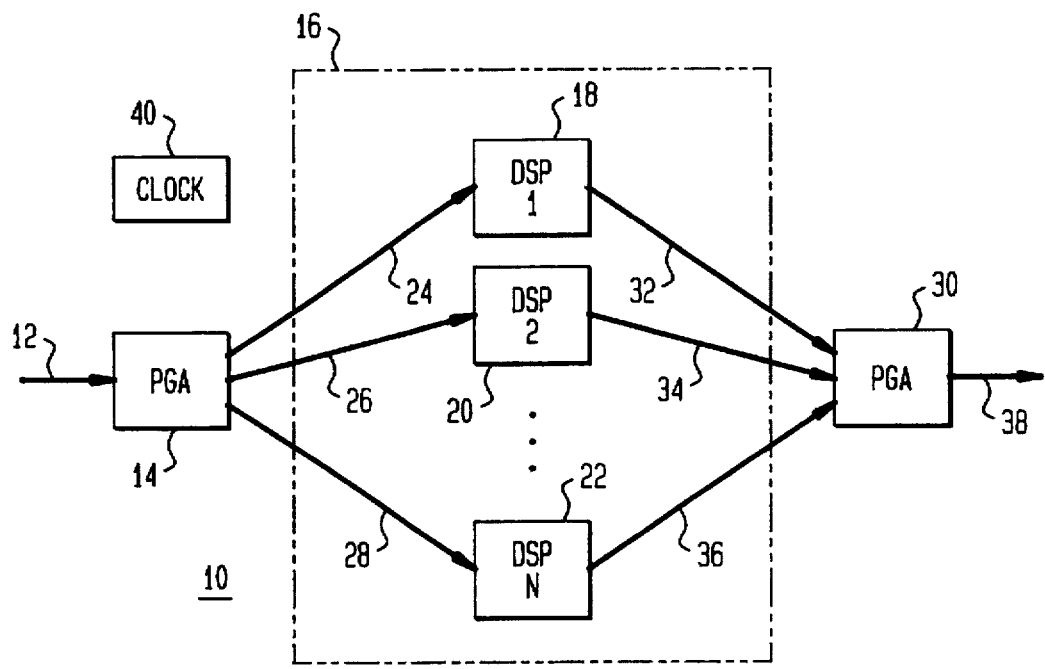
FIG. 1 is a block diagram of a typical prior art digital signal processing unit using a digital signal processor (DSP) array.

FIG. 1 illustrates a digital signal processing unit 10 typical of the type found in the prior art. A processing unit input line 12 carries an incoming sequential data stream and supplies it to an input programmable gate array (PGA) 14. A digital signal processor (DSP) array 16 (shown in a dashed rectangle) comprises N DSPs, where N is an integer greater than unity. For simplicity, of these DSPs, only the first and second DSPs 18 and 20 and the Nth DSP 22 are shown. Corresponding input lines 24, 26, and 28 are shown connecting input PGA 14 to DSP 18, DSP 20, and DSP 22, respectively, and carry individual data sequences to the respective DSP designated to process them. Typically, all DSPs in DSP array 16 are identical and are not restricted with respect to the individual tasks which they can perform.

An output PGA 30, receives processed data from DSPs 18, 20, and 22 over respective output lines 32, 34, and 36. A unit output line 38 is connected to transmit processed output data from output PGA 30. A common system clock 40 is employed in a conventional manner to control timing for input PGA 14, DSPs 18 through 22, and output PGA 30. In order to avoid complicating the figure unnecessarily, individual connections from clock 40 to PGAs 14 and 30 and DSP array 16 are not shown.

In prior art digital signal processing unit 10, individual data sequences in an incoming data stream on processing unit input line 12 are distributed by input PGA 14 to their individual DSPs for processing. Individual processed output data sequences are collected by output PGA 30 and delivered to processing unit output line 38. Either processing unit input line 12 or processing unit output line 38 may, if desired, be replaced by multiple processing unit input or output lines.

Figure 2:
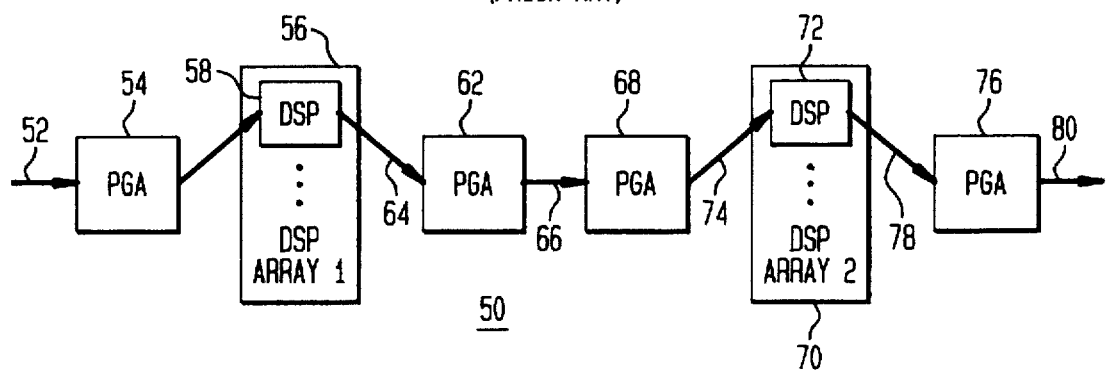
FIG. 2 is a block diagram of two typical prior art digital signal processing units using DSP arrays, where the processing units are concatenated to form a serial chain.

A prior art solution to the problem of processing individual data sequences by more than one DSP is illustrated in FIG. 2, where two digital signal processing units are concatenated to form a tandem chain 50. In FIG. 2, a first processing unit input line 52 is connected to a first input PGA 54. Input PGA 54 distributes individual data sequences to respective DSPs in a first DSP array 56. Within DSP array 56, only one DSP 58 is shown for the sake of simplicity, although it should be understood that a plurality of DSPs are included. For simplicity, only a single input line 60 leading to DSP 58 is shown, although it should also be understood that there is a respective individual input line leading from input PGA 54 to each DSP within DSP array 56.

Similarly, at the output side of first DSP array 56, a first output PGA 62 receives processed data from all of the DSPs included in DSP array 56 over respective output lines, although only output line 64 from DSP 58 is shown. Output PGA 62 combines the processed data on a unit output line 66, which also serves as a unit input line for the second digital signal processing unit in the chain. Line 66 thus provides input to a second input PGA 68.

Input PGA 68 distributes individual data sequences to respective DSPs in a second DSP array 70. Within DSP array 70, only one DSP 72 is shown, although it should be understood, once again, that a plurality of DSPs are included. For simplicity, only a single input line 74 leading to DSP 72 is shown, although it should again be understood that there is a respective individual input line leading from input PGA 68 to each DSP within DSP array 70.

At the output side of second DSP array 70, a second output PGA 76 receives processed data from all of the included DSPs over respective output lines, although only one output line 78 from DSP 72 is shown. Output PGA 76 combines the processed data on a unit output line 80.

The concatenated signal processing units illustrated in FIG. 2 may solve the problem of completing the processing of all incoming data, but at the cost of replicating DSP array 56 and its associated PGAs 54 and 62. If the second processing unit in the chain is not sufficient to complete the processing, further signal processing units may be concatenated in like manner, but once again at the cost of further replicating complete digital signal processing units.

Figure 3:
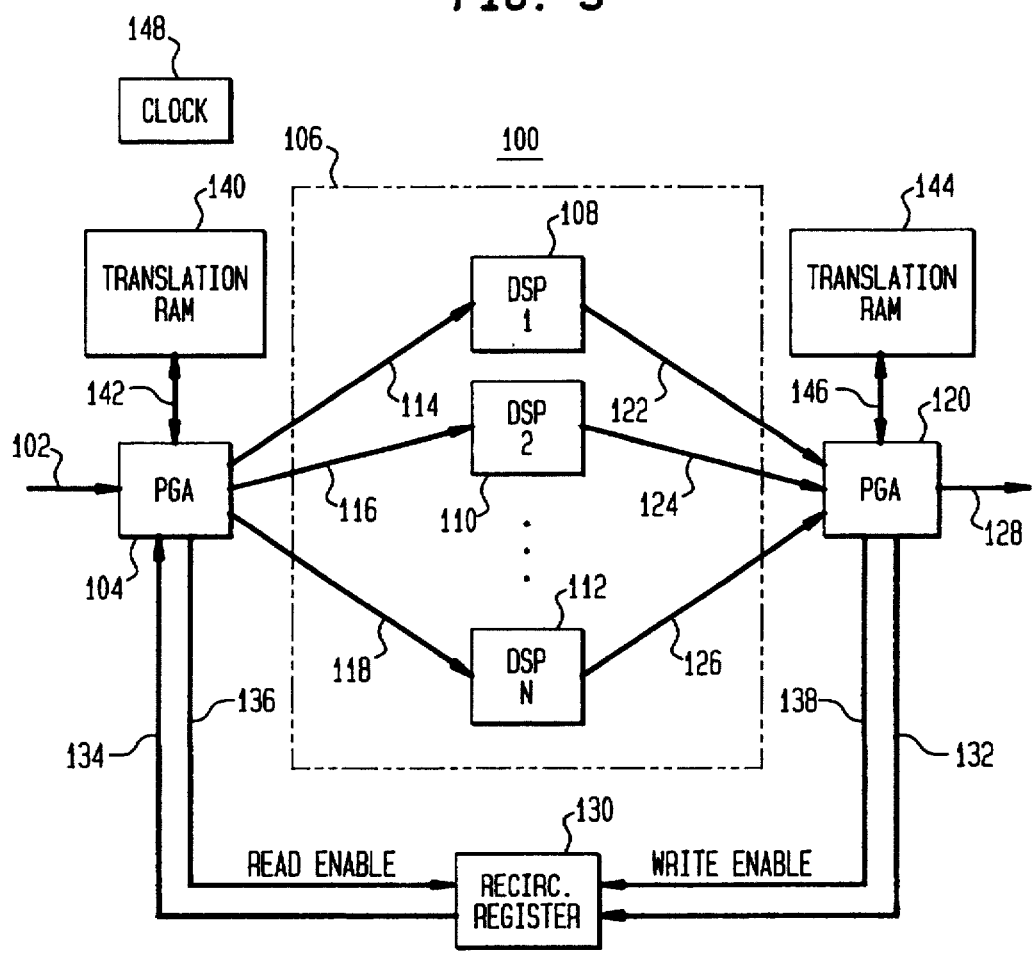
FIG. 3 is a block diagram of a digital signal processing unit embodying the present invention.

A specific embodiment of the invention is illustrated in FIG. 3. There, a digital signal processing unit 100 includes a processing unit signal input line 102. Additional processing unit signal input lines may be employed if it is necessary, but one processing unit signal input line is typical.

Processing unit signal input line 102 is connected to an input PGA 104. A DSP array 106 (shown in a dashed rectangle) comprises a plurality of individual DSPs, of which only the first DSP 108, the second DSP 110, and the Nth DSP 112 are shown. Individual sequences of data are supplied to DSPs 108, 110, and 112 from input PGA 104 over input lines 114, 116, and 118, respectively (other DSPs not shown will, of course, have their own individual input lines.

The component DSPs of DSP array 106 supply processed data to an output PGA 120 over individual output lines, of which lines 122, 124, and 126 are shown. Output line 122 supplies processed data from first DSP 108 to output PGA 120, output line 124 supplies processed data from second DSP 110 to output PGA 120, and output line 126 supplies processed data from Nth DSP 112 to output PGA 120. Again, other DSPs not shown will have their own individual output lines to output PGA 120. Typically, all DSPs in DSP array 106 are identical and are not restricted with respect to the individual tasks they can perform.

A processing unit signal output line 128 is connected to the output side of output PGA 120 to carry processed data. Again. additional processor unit signal output lines may be employed if desired.

The recirculation path provided by the invention is based upon a recirculation (RECIRC.) register 130. which receives data input from output PGA 120 over a recirculation input line 132 and supplies it to input PGA 104 over a recirculation output line 134. For timing. a read enable signal is supplied to recirculation register 130 from input PGA 104 over a read enable control path 136 and a write enable signal is supplied to recirculation register 130 from output PGA 120 over a write enable control path 138.

The remainder of signal processing unit 100 comprises a first translation RAM 140. connected to input PGA 104 over a two-way path 142. a second translation RAM 144. connected to output PGA 120 over a two-way path 146. and a system clock 148. Because clock 148 controls the timing of the significant components of processing unit 100 in the manner conventionally employed in the digital signal processing art. individual connecting paths are not shown in order to avoid unnecessarily complicating the figure.

First translation RAM 140 controls input PGA 104 and assigns task and DSP numbers to each sequence of incoming data. In this manner. input PGA 104 steers each sequence over the appropriate one of processor input lines 114–118 to the assigned one of DSPs 108–112. The second translation RAM 144 controls output PGA 120. assigning new task numbers to each sequence of data passed through DSP array 106. In accordance with the invention. the second translation RAM 144 also assigns a destination DSP in DSP array 106 for any data sequence for which processing is incomplete. In this manner. output PGA 120 steers recirculated data sequences back to input PGA 104. Such data is transmitted to recirculation register 130. with output PGA 120 using write enable control path 138 to control the writing of data into recirculation register 130. Input PGA 104 uses read enable control path 136 to control the reading of data out of recirculation register 130 into input PGA 104.

Both first translation RAM 140 and second translation RAM 144 contain look-up tables which control the described action. Such tables are pre-programmed to fit the needs of the data which digital signal processing unit 100 is designed to receive.

Figure 4:
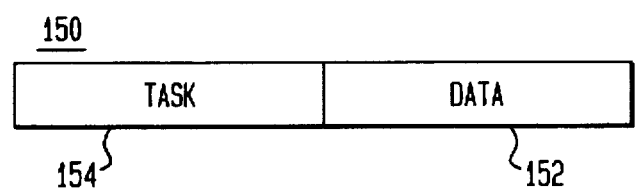
FIG. 4 represents a sequence of data passed through an individual DSP in the forward direction in the embodiment of the invention illustrated in FIG. 3.

Individual data sequences passed through each of DSPs 108–112 normally take the form illustrated in FIG. 4. As shown. a forward data sequence 150 passing through a DSP in DSP array 106 has. in addition to a data byte 152. a field containing a task identifier 154. Each task identifier 154 is assigned by first translation RAM 140 and is used first to control DSP assignment and then by second translation RAM 144 to control further processing.

Figure 5:
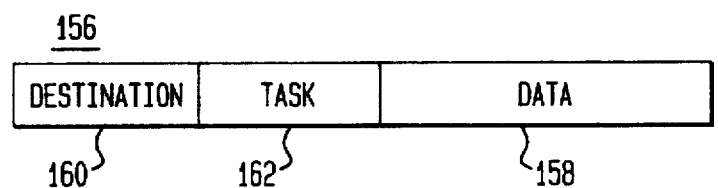
FIG. 5 represents a recirculated sequence of data in the embodiment of the invention illustrated in FIG. 3.

Recirculated data in the embodiment of the invention illustrated in FIG. 3 normally takes the form shown in FIG. 5. As shown. a recirculated data sequence 156 normally has. in addition to a data byte 158. a field comprising both a destination DSP number 160 and a new task number 162.

The path taken by an individual recirculated data sequence may be illustrated by a specific example with reference to the embodiment of the invention shown in FIG. 3. In such an example. the data stream entering signal processing unit 100 from unit input line 102 contains at least one data sequence in which the data byte requires more processing than one pass through DSP array 106 will allow. Input PGA 104 steers that data sequence to. for example. processor input line 116 and DSP 110. having assigned the data sequence a task number and a destination DSP number under control of first translation RAM 140. From DSP 110. the partially processed data sequence travels over processor output line 124 to output PGA 120.

When the partially processed data sequence reaches output PGA 120. it is assigned a new task number (which may be but is not necessarily the same as its original task number) and a new destination DSP number (which may be but is not necessarily the same as its original destination DSP number). Output PGA 120 then steers the data sequence back to recirculation register 130. from which it is read out and transmitted to input PGA 104. If the new destination DSP for the recirculated data sequence is DSP 108. the data sequence travels over processor input line 114. through DSP 108. and back over processor output line 122 to output PGA 120.

From output PGA 120. the data sequence may be transmitted out over unit output line 128 if processing has been completed or back through recirculation register 130 for yet another pass through DSP array 106 if the data byte it contains requires still further processing. The recirculation process may be repeated as many times as necessary to complete processing and as many data sequences as require further processing may be recirculated. First translation RAM 140 and second translation RAM 144 are both programmed to control not only the initial pass of data sequences through DSP array 106 but also each pass of recirculated data sequences back through recirculation register 130 and related follow-up passes through DSP array 106. In this way. each DSP in DSP array 106 can direct its output stream to any output device. and one such output device may serve as a port through which its data is re-routed to any DSP.

Advantages afforded by the invention include the following: (1) the feature of no DSP being different from any other DSP is maintained by avoiding direct. permanent connections between DSPs. (2) the format of the input data stream to any DSP is the same. regardless of whether it is from an input device or from another DSP. and (3) the format of the output data stream from any DSP is the same. regardless of whether it is directed to an output device or back to another DSP.

It is to be understood that the embodiments of the invention which have been described are illustrative. Numerous other arrangements and modifications may be readily devised by those skilled in the art without departing from the spirit and scope of the invention.

We claim:

1. A digital signal processing unit comprising:

at least one unit signal input line for receiving a serial succession of individual sequences of input data;

an input programmable gate array (PGA) connected to said unit signal input line for supplying said input data as distributed data on a plurality of processor input lines;

an array of digital signal processors (DSP). each of said DSPs connected to a corresponding one of said plurality of processor input lines. each of said array of DSPs processing an individual sequence of the distributed data received on the corresponding one of said processor input lines and outputting processed data on a corresponding one of a plurality of processor output lines. where each element of a processed data sequence includes. in addition to a data byte. a task designating field permitting identification of that sequence;

an output PGA connected to said processor output lines for organizing and outputting the processed data;

a recirculation path connected from said output PGA to said input PGA to pass any sequence of said processed data that requires further processing through said array of DSPs at least one more time, said data includes a task designating field and a destination designating field, said destination designating field controlling the one of said DSPs from which the associated data sequence receives additional processing and said task designating field identifying said associated data sequence;

at least one unit signal output line for transmitting the processed data from said output programmable gate array; and a system clock for controlling timing of said DSPs, said input programmable gate array and said output programmable gate array.

2. The digital signal processing unit of claim 1 in which a first translation random access memory (RAM) controls said input programmable gate array and a second translation RAM controls said output programmable gate array.

3. The digital signal processing unit of claim 2 in which a look-up table in said second translation RAM translates said task designating field to determine whether a data sequence requires further processing, and if so, to form a destination segment identifying the one of said DSPs from which its respective data sequence is to receive additional processing and a task segment to identify said associated data sequence.

4. The digital signal processing unit of claim 1 in which said recirculation path carries the recirculated data sequence and which includes a recirculation register the timing of which is under the control of said system clock.

5. The digital signal processing unit of claim 4 in which said recirculation register is read enabled by said input programmable gate array and in which said recirculation register is write enabled by said output programmable gate array.

6. The digital signal processing unit of claim 1 in which data sequences are recirculated through the same DSP in said array that processed them previously.

7. The digital signal processing unit of claim 1 in which data sequences are recirculated through a DSP in said array different from the one that processed them previously.

\* \* \* \* \*